A. B. & C. C. SMALL.
TRANSMISSION GEARING.
APPLICATION FILED SEPT. 29, 1914.
1,156,938.
Patented Oct. 19, 1915.
2 SHEETS—SHEET 1.
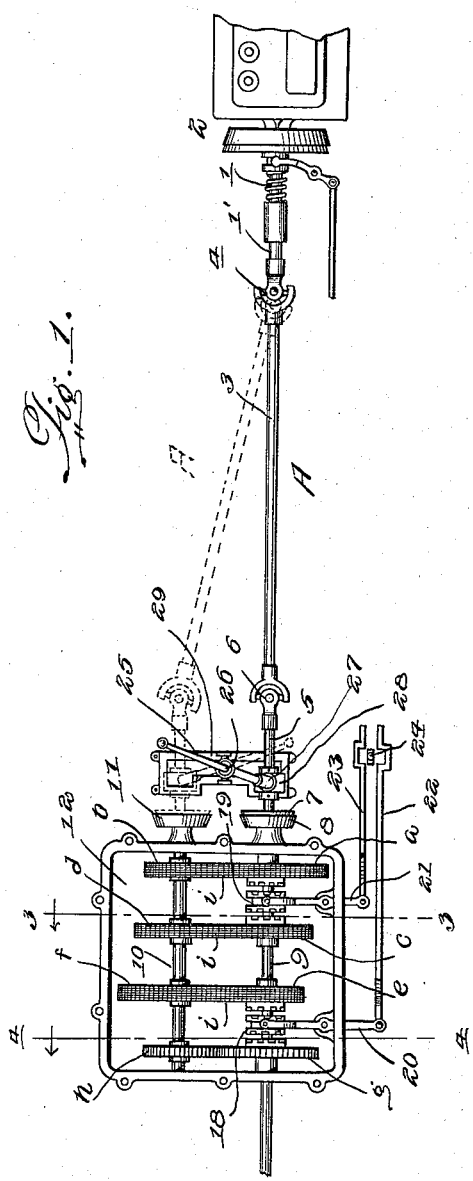
Witnesses
Frederick L. Fox.
R. M. Smith.
Inventors
A. B. Small.
C. C. Small.
By Victor J. Evans.
Attorney

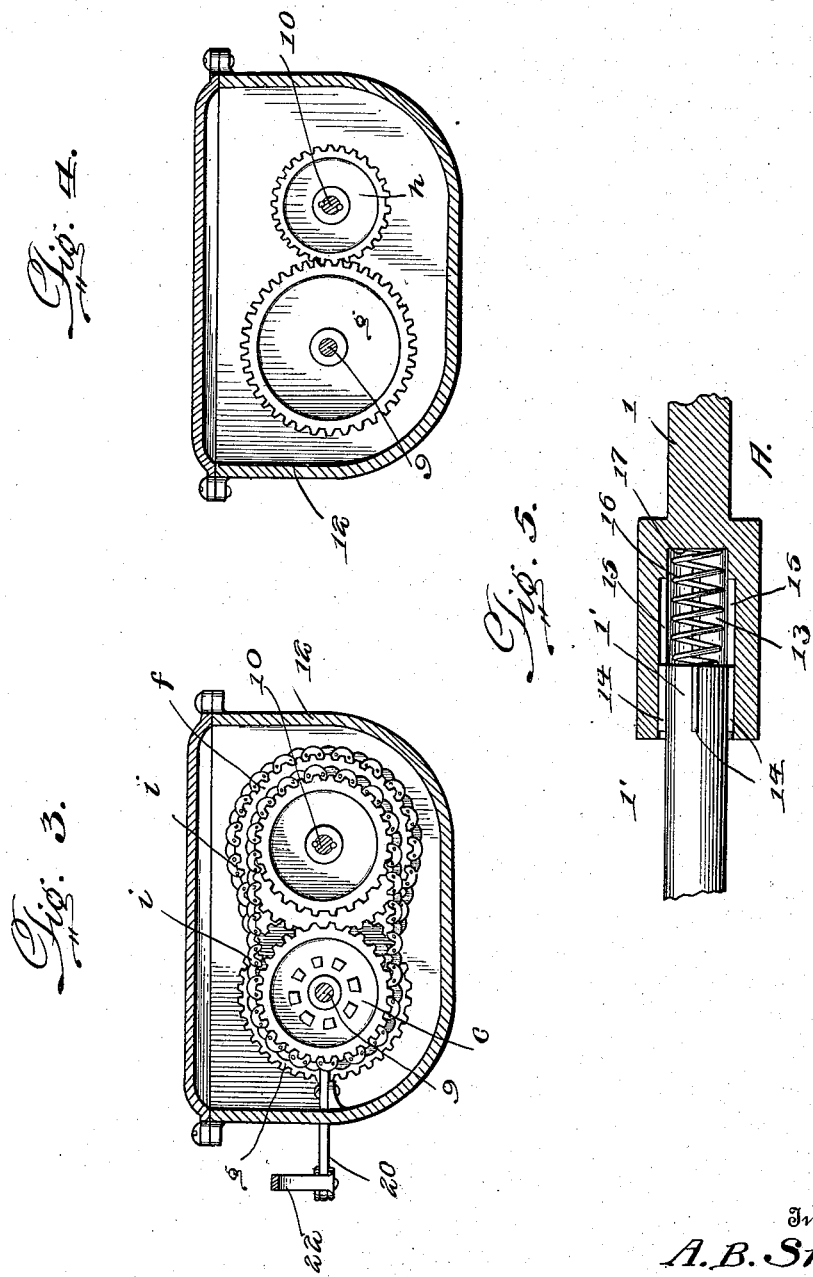

UNITED STATES PATENT OFFICE.

ALFRED B. SMALL AND CARLETON C. SMALL, OF LAKE CITY, FLORIDA.

TRANSMISSION-GEARING.

1,156,938. Specification of Letters Patent. Patented Oct. 19, 1915.

Application filed September 29, 1914. Serial No. 864,139.

*To all whom it may concern:*

Be it known that we, ALFRED B. SMALL and CARLETON C. SMALL, citizens of the United States, residing at Lake City, in the county of Columbia and State of Florida, have invented new and useful Improvements in Transmission-Gearing, of which the following is a specification.

This invention relates to transmission gearing, the same being especially designed for use in connection with motor vehicles to enable several different speeds ahead and reverse to be obtained without the necessity of using the large number of gears now in common use.

The main object of the present invention is to reduce the number of gears through which the power is transmitted on speeds other than direct drive and at the same time afford a direct drive on the desired ratio, incidentally reducing the friction and obtaining a greater proportionate delivery of power per given gear ratio, one of the main features of the invention residing in transmitting the power of the engine or driving shaft directly to either the main transmission shaft or to the countershaft.

With the above and other objects in view, the invention consists in the novel construction, combination and arrangement of parts, as will be hereinafter more fully described, illustrated and claimed.

In the accompanying drawings:—Figure 1 is a plan view of the transmission gearing of this invention, the top or cover of the gear case being omitted and parts being shown in dotted lines. Fig. 2 is a side elevation of the same with the adjacent wall of the gear case removed. Fig. 3 is a vertical cross section on the line 3—3 of Fig. 1. Fig. 4 is a vertical cross section on the line 4—4 of Fig. 1. Fig. 5 is a detail longitudinal section illustrating the slide joint between the sections of the driving shaft.

Referring to the drawings A generally designates the driving shaft which in automobile practice constitutes what is known as the drive shaft of the machine, the same usually leading from the foot operated clutch rearwardly to the transmission gearing and differential.

Under the present invention, the shaft A comprises a forward section 1 to which is fastened the usual foot operated clutch 2 shown in the form of the usual cone clutch although of course any desired form of clutch may be used at this point. The shaft A also comprises a section 3 which is connected to the section 1 by a universal joint 4 and which is connected to the next section 5 in rear thereof by another universal joint 6, the construction referred to enabling the shaft A to be shifted laterally from the full line position to the dotted line position shown in Fig. 1 and vice versa for a purpose which will hereinafter appear.

At its rear extremity the shaft section 5 is provided with a male clutch member 7 adapted to be moved into and out of engagement with a female clutch member 8 on the adjacent extremity of the main transmission shaft 9 which under one adjustment of the parts forms an extension of the shaft A.

Parallel to the transmission shaft A is a countershaft 10 which is provided at its forward end with a female clutch member 11 corresponding exactly with the clutch member 8 and also adapted to be engaged by the male clutch member 7 on the adjacent extremity of the shaft A when the last named shaft is shifted in the manner indicated in the drawings and above referred to.

The shafts 9 and 10 extend in parallel relation to each other through a gear case 12 in which they are journaled and held against longitudinal movement, said gear case being of sufficient size to receive the shafts 9 and 10 and the gearing associated therewith. The shaft 9 has thereon gears $a$, $c$, $e$ and $g$ while the shaft 10 has thereon gears $b$, $d$, $f$ and $h$. The gears on one of said shafts are made permanently fast thereon while the gears on the other shaft are normally loose but adapted to be thrown into locked engagement with the shaft one at a time only by means hereinafter referred to. Silent chains $i$ connect the gears $a$ and $b$, the gears $c$ and $d$, and the gears $e$ and $f$ as indicated in Fig. 1 while the gears $h$ and $g$ are of the spur type and mesh directly with each other so that when the gears $h$ and $g$ are in operation, the shafts 9 and 10 are driven in opposite directions. Under all of the other gears, however, the shafts 9 and 10 are driven in the same direction by means of the sprocket gears and silent chains referred to.

In connection with the universal joint 4 or immediately adjacent thereto, the shaft A is provided with a slide joint as shown in Fig. 5, one of the shaft sections indicated at 1 being centrally and longitudinally bored as shown at 13 to receive the adjacent section 1' of the shaft which fits therein and is provided with one or more keys 14 received in one or more corresponding key ways 15 in the shaft section. A thrust spring 16 is arranged behind the forward extremity of the shaft section 1' as shown in Fig. 5, said spring also bearing against an internal shoulder 17 within the shaft section 1. Therefore, the spring 16 serves to thrust the shaft section 1' and other sections in rear thereof rearwardly so as to maintain the engagement between the clutch member 7 and one or the other of the clutch members 8 and 11 above referred to. The spring 16 also acts to thrust the forward section of the shaft A in a forward direction to maintain the clutch 2 at the forward extremity thereof in engagement with the complemental clutch member usually carried by the engine shaft.

Any suitable means may be employed for throwing the gears a, c, e and g, for example, into locked engagement with the shaft 9. The means illustrated in the drawings comprises a pair of double faced clutches 18 and 19 movable in opposite directions to engage the walls at opposite sides thereof by means of forked shifting levers 20 and 21, the clutches 18 and 19 being feathered to the shaft 9. Connected to the levers 20 and 21 and extending forwardly therefrom are clutch rods 22 and 23 which are adapted to be engaged one at a time by means of a gear shifting lever 24 which is moved laterally to engage the desired rod 22 or 23 and then thrust forwardly or rearwardly to effect an engagement between the desired gear and its shaft. In this way only one of the gears a, c, e and g may be locked to the shaft at a time. It must be understood, however, that instead of locking the gears a, c, e and g to the transmission shaft 9, the same result may be obtained by providing means for locking the gears b, d, f and h to the countershaft 10.

The shaft A may also be shifted by any desired means, that shown consisting of a manually controlled lever 25 universally fulcrumed at 26 on the frame and connected at 27 to the shaft A which at this point is shown as journaled in a slidable bearing 28 movable in a fore and aft direction and mounted in turn upon a laterally slidable bearing 29 thus providing for both movements of the shaft A, one movement being endwise to throw the clutch member 7 toward and away from either of the clutch members 8 and 11 and the other movement being lateral as indicated by dotted lines in Fig. 1 so as to effect an engagement of the shaft A with either the shaft 9 or the countershaft 10.

By shifting the main driving shaft from the main transmission shaft to the countershaft, the number of gears now necessarily used is decreased and it is only necessary to transmit the power from one shaft to the other and not in both directions back and forth as is now the case. Under the present invention in all other gears than direct gear, the power is transmitted from the driving shaft direct to the countershaft and then by means of the silent chains to the main transmission shaft. This results in a reduction of the number of gears through which the power is transmitted and a proportionate reduction in friction and of course a proportionate increase in the power delivered to the driving wheels of the machine. This is true with regard to all speeds other than direct drive. In the direct drive, the power of the driving shaft is delivered directly to the main transmission shaft which in turn drives the differential gearing directly.

It will be understood that the gear case and the transmission gearing may be placed at any desired location either forward close to the engine or rearward in close proximity to the differential gearing, the last named location being preferred inasmuch as the greater the length of the driving shaft from the cone clutch to its point of connection with the transmission gearing, the less the angle of offset required to be taken care of by the universal joints referred to.

What we claim is:—

1. In transmission gearing, a driving shaft, a main transmission shaft, a countershaft parallel to said transmission shaft, a set of gears on the transmission shaft, a set of complemental gears on the countershaft, clutch members on the corresponding extremities of said transmission shaft and countershaft, a clutch member on the adjacent extremity of said driving shaft, and means for shifting the last named clutch member into engagement with either of the first mentioned clutch members, and locking and unlocking means for the gears on one shaft.

2. In transmission gearing, a longitudinally and laterally movable driving shaft, a main transmission shaft, a countershaft parallel to said transmission shaft, a set of gears on the transmission shaft, a set of complemental gears on the countershaft, clutch members on the corresponding extremities of said transmission shaft and countershaft, a clutch member on the adjacent extremity of said driving shaft, means for shifting the last named clutch member into engagement with either of the first mentioned clutch members, and locking and unlocking means for the gears on one shaft.

3. In transmission gearing, a driving shaft, a main transmission shaft, a countershaft parallel to said transmission shaft, a set of gears on the transmission shaft, a set of complemental gears on the countershaft, chains connecting complemental gears of said sets causing the transmission shaft and countershaft to revolve in the same direction, clutch members on the corresponding extremities of said transmission shaft and countershaft, a clutch member on the adjacent extremity of said driving shaft, means for shifting the last named clutch member into engagement with either of the first mentioned clutch members, and locking and unlocking means for the gears on one shaft.

4. In transmission gearing, a driving shaft, a main transmission shaft, a countershaft parallel to said transmission shaft, a set of gears on the transmission shaft, a set of complemental gears on the countershaft, chains connecting complemental gears of said sets causing the transmission shaft and countershaft to revolve in the same direction, clutch members on the corresponding extremities of said transmission shaft and countershaft, a clutch member on the adjacent extremity of said driving shaft, means for shifting the last named clutch member into engagement with either of the first mentioned clutch members, locking and unlocking means for the gears on one shaft, and intermeshing spur gears on the transmission shaft and countershaft one of which is adapted to be thrown into and out of locked engagement with its shaft to reverse the direction of rotation of said shafts.

5. In transmission gearing, a longitudinally and laterally movable driving shaft, a main transmission shaft, a countershaft parallel to said transmission shaft, a set of gears on the transmission shaft, a set of complemental gears on the countershaft, clutch members on the corresponding extremities of said transmission shaft and countershaft, a clutch member on the adjacent extremity of said driving shaft, means for shifting the last named clutch member into engagement with either of the first mentioned clutch members, locking and unlocking means for the gears on one shaft, and means for yieldingly holding said driving shaft toward either the transmission shaft or countershaft.

In testimony whereof we affix our signatures in presence of two witnesses.

ALFRED B. SMALL.
CARLETON C. SMALL.

Witnesses:
GUSSIE MILLER,
LOIS HALE.

Copies of this patent may be obtained for five cents each, by addressing the "Commissioner of Patents, Washington, D. C."